US008646781B2

(12) United States Patent
Gunderson (10) Patent No.: US 8,646,781 B2
(45) Date of Patent: Feb. 11, 2014

(54) HEAT-ASSISTED HERMETIC SPRING SEAL (75) Inventor: Neal Frank Gunderson, Lake Elmo, MN (US)

(73) Assignee: Seagate Technology, Cupertino, CA (US)

(*) Notice: Subject to any disclaimer, the term of this patent is extended or adjusted under 35 U.S.C. 154(b) by 1048 days.

(21) Appl. No.: 12/336,856

(22) Filed: Dec. 17, 2008

(65) Prior Publication Data

US 2009/0102131 A1 Apr. 23, 2009

Related U.S. Application Data (62) Division of application No. 11/042,307, filed on Jan. 25, 2005, now abandoned.

(60) Provisional application No. 60/541,991, filed on Feb. 5, 2004.

(51) Int. Cl.
F16J 15/02 (2006.01)

(52) U.S. Cl.
USPC ........................................................ 277/312

(58) Field of Classification Search
USPC .................. 277/312, 316, 644, 647, 650, 653
See application file for complete search history.

(56) References Cited

U.S. PATENT DOCUMENTS

| | | | | |
|---|---|---|---|---|
| 4,261,584 A | * | 4/1981 | Browne et al. | 277/647 |
| 4,477,087 A | * | 10/1984 | Sutter et al. | 277/644 |
| 5,454,157 A | | 10/1995 | Ananth et al. | 29/603 |
| 5,639,100 A | | 6/1997 | Garrigues et al. | 277/164 |
| 5,936,758 A | * | 8/1999 | Fisher et al. | 359/224.1 |
| 6,317,286 B1 | | 11/2001 | Murphy et al. | 360/97.02 |
| 6,644,362 B2 | | 11/2003 | Bernett | 141/66 |
| 6,675,894 B2 | | 1/2004 | Vick, Jr. et al. | 166/285 |
| 6,683,747 B2 | | 1/2004 | Bernett | 360/97.02 |
| 2002/0053238 A1 | | 5/2002 | Fahrenbach et al. | 73/290 |
| 2002/0089782 A1 | | 7/2002 | Hearn et al. | 360/97.02 |
| 2002/0090761 A1 | | 7/2002 | Goldmann et al. | 438/124 |
| 2002/0114104 A1 | | 8/2002 | Hearn et al. | 360/97.01 |
| 2002/0196830 A1 | | 12/2002 | Ujazdowski et al. | 372/55 |
| 2003/0133210 A1 | | 7/2003 | Isbert et al. | 359/894 |
| 2003/0179489 A1 | | 9/2003 | Bernett et al. | 360/97.01 |
| 2003/0198428 A1 | | 10/2003 | Humpston et al. | 385/16 |

OTHER PUBLICATIONS

French, Thomas E.; Vierck, Charles J. *Engineering, Drawing & Graphic Technology.* "Dimensions, Notes, Limits, and Precision." Twelfth ed. Ed. Elia, Michael; Maisel, J.W. McGraw-Hill Book Company. New York. 1978. pp. 383-386.

Marks, Lionel Simeon. *Marks' Standard Handbook for Mechanical Engineers.* "Surface-Texture Designation, Production, and Control." Eighth ed. Ed. Baumeister, Theodore; Avallone A.; Baumeister, Theodore III. McGraw-Hill Book Company. New York. 1978. pp. 13-76.

Meyers, Robert A. *Encyclopedia of Physical Science and Technology* vol. 17. "Shape and Properties of Surfaces." Second ed. Academic Press, Inc. San Diego. 1992. pp. 66.

* cited by examiner

*Primary Examiner* — Vishal Patel
(74) *Attorney, Agent, or Firm* — Braden Katterheinrich (57) ABSTRACT A hermetic seal includes a spring seal compressed with a limited sealing force between sealing surfaces. The sealing surfaces surround a gas-filled cavity that houses heat sensitive components. The hermetic seal includes a film that joins the spring seal to the sealing surfaces. The film includes a material that is softenable by heat to hermetically seal the spring seal to the sealing surfaces. The hermetic seal includes an externally accessible surface for selectively application of the heat to the film, without overheating the heat sensitive components.

19 Claims, 6 Drawing Sheets

HEAT-ASSISTED HERMETIC SPRING SEAL

CROSS-REFERENCE TO RELATED APPLICATION

The present application is a division of and claims priority of pending U.S. patent application Ser. No. 11/042,307 filed Jan. 25, 2005 and claims the benefit of U.S. Provisional Application 60/541,991, filed on Feb. 5, 2004.

FIELD OF THE INVENTION

The present invention relates generally to hermetic seals, and more particularly but not by limitation to hermetic seals that are maintained with a reduced compressive sealing force or non-ideal sealing surfaces.

BACKGROUND OF THE INVENTION

Magnetic storage devices, such as disc drives, are typically enclosed in housings to provide a clean, particle-free environment for internal components to operate with close spacings between moving parts. In particular, a spacing or fly height between data storage discs and disc head sliders is extremely close and requires an extremely clean environment. There is a desire to increase areal density of information storage on data storage discs and to make corresponding reductions in fly height. These increases in areal density and reductions in fly height are difficult to achieve with air in the disc drive housing, thus there is a desire to provide disc drives with helium to facilitate greater tracks per inch (tpi) for increased areal density and a reduction in fly height. It is found, however, that housing sealing methods used in disc drives are not adequate to provide containment of helium over an operating life of a disc drive, which is typically five years or more.

Disc drive housings are typically formed of light metal that can't provide adequate sealing forces to provide hermeticity with compressed O-ring seals. Vacuum tight sealing methods such as welding and soldering are difficult to implement with disc drives because the heating associated with welding or soldering can overheat heat-sensitive components in the disc drive.

A method and apparatus are needed that will provide hermetic sealing of a sealed assembly such as a disc drive without overheating heat sensitive components in the sealed assembly. Embodiments of the present invention provide solutions to these and other problems, and offer other advantages over the prior art.

SUMMARY OF THE INVENTION

Disclosed is a hermetic seal comprising a spring seal compressed with a limited sealing force between sealing surfaces. The sealing surfaces surround a gas-filled cavity that houses heat sensitive components.

The hermetic seal comprises a film that joins the spring seal to the sealing surfaces. The film comprises a material that is softenable by heat to hermetically seal the spring seal to the sealing surfaces.

The hermetic seal comprises an externally accessible surface for selectively application of the heat to the film, without overheating the heat sensitive components.

Other features and benefits that characterize embodiments of the present invention will be apparent upon reading the following detailed description and review of the associated drawings.

DETAILED DESCRIPTION OF ILLUSTRATIVE EMBODIMENTS

In the embodiments described below in FIGS. 1, 3-11, a hermetic seal between cover faces is provided that does not require high compression forces, can be used with non-ideal seal face finishes, and does not require heating that can damage heat sensitive components. A spring seal is compressed between the cover faces with a limited sealing force. A heat-sealable film is provided that joins the spring seal to the cover faces. Heat is selectively applied to an externally accessible surface to selectively heat the film. The film is softened by the heat and deforms to fill surface roughnesses on the cover faces and form a hermetic seal without the use of high compressive forces. The completed hermetic seal is cooled, and a fill gas such as helium is introduced into a cavity surrounded by the hermetic seal. The arrangement provides long term retention of the fill gas needed for years of operation. The arrangement allows helium filled disc drives to be manufactures economically and used for an extended period of time without a need to refill the disc drive with helium.

Figure 1:
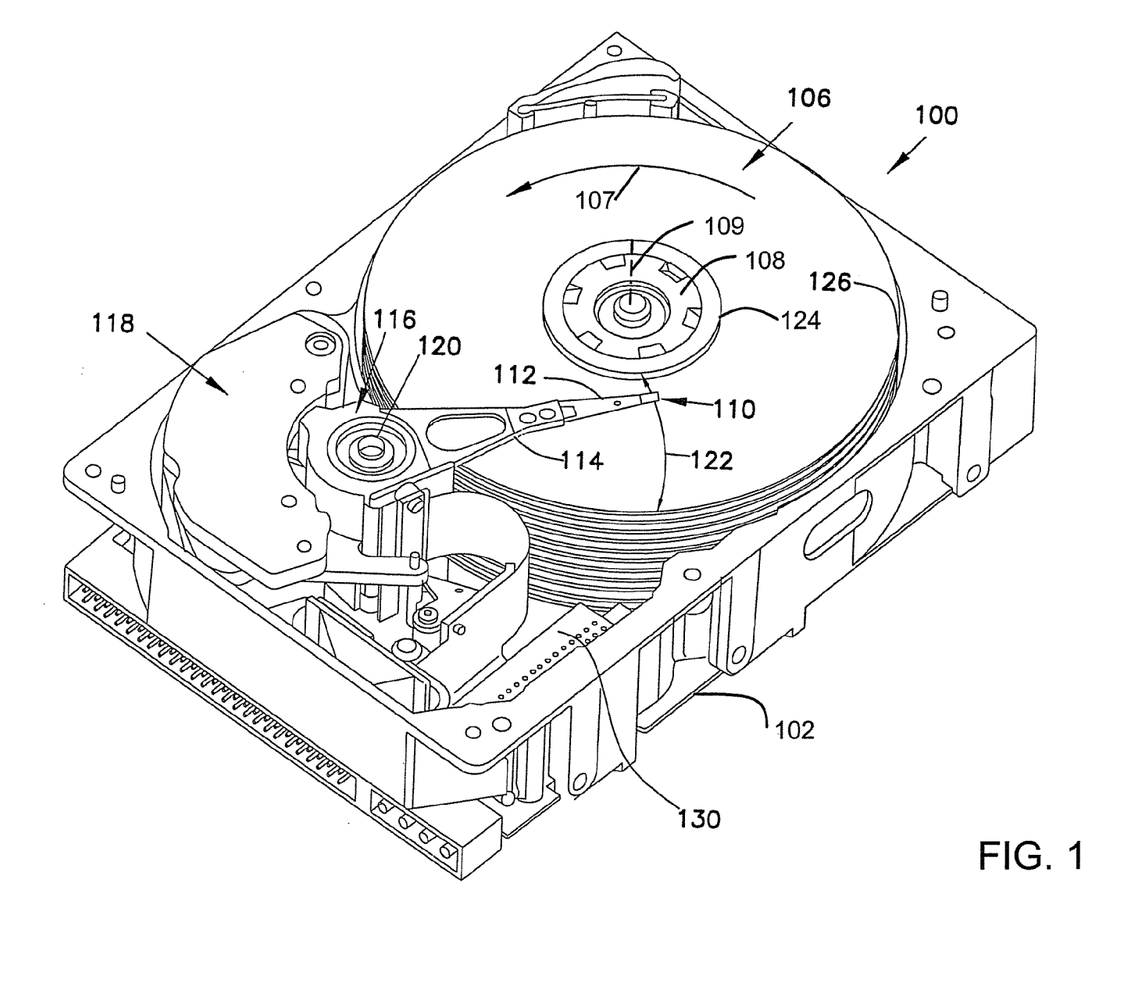
FIG. 1 is an oblique view of a disc drive.

FIG. 1 is an oblique view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes one or more individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

The top cover is installed on the base 102 using a hermetic seal as described below in connection with FIGS. 4-11. An interior space of the disc drive 100 is then filled with a fill gas such as helium. The fill gas, which is less dense than air, facilitates improved performance, particularly in the area of reduced head tracking disturbance to the head slider 110 in the reduced density fill gas. The term "hermetic" as used in this application means that leakage of fill gas from the interior space and leakage of air into the interior space are reduced to leakage rates that are low enough so that the improved performance due to low density is maintainable for five years or longer. In a typical disc drive 100, this means that leak rates are less than 3.2×10⁻⁸ cubic centimeters per second.

Figure 2:
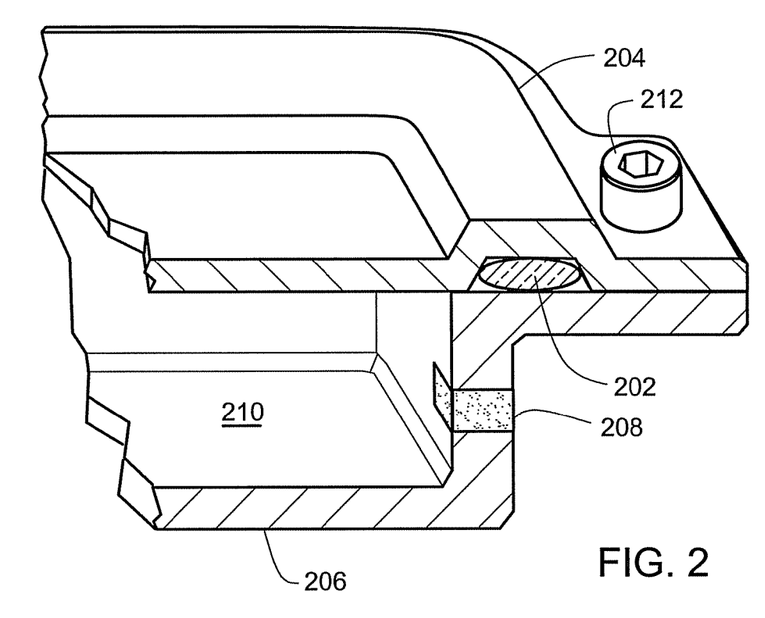
FIG. 2 illustrates a disc drive fluoro-elastomer seal.

FIG. 2 illustrates a fluoro-elastomer O-ring 202 that is compressed in an O-ring groove between a top cover 204 and a bottom cover 206 (also called a base). The bottom cover 206 includes a dust filter or vent 208 that equalizes an air pressure in a cavity 210 with a surrounding atmospheric pressure. The cavity 210 exchanges air through the vent 208 with the surrounding atmosphere as temperature changes. There is no significant pressure differential across the O-ring 202, and the air in the cavity 210 has substantially the same composition as the surrounding atmosphere. The O-ring 202 serves only as a dust and moisture seal. The O-ring 202 does not provide a hermetic seal and air is free to diffuse past and through the O-ring 202 into and out of the housing. When an attempt is made to adapt the arrangement in FIG. 2 by eliminating the vent 208 and filling the cavity 210 with a fill gas different than the surrounding atmosphere, it is found that the fill gas diffuses past and through the O-ring 202 and is lost, and that air diffuses past and through the O-ring 202, and the cavity 210 becomes contaminated with air, reducing the reliable useful life of the fill gas. It is difficult to achieve the high clamp forces required to seal the O-ring 202 in disc drives due to industry and market requirements to maintain small package form factors (thin walls on the base 206 and cover 204) relative to internal volume required by components, such as discs. These restrictions also limit the size of screws (such as screw 212) to a #4 size or smaller. In addition, cost and automation requirements often limit the number of screws and the level of screw preloading that can be employed on the periphery of a disc drive housing for attaching a cover to a base.

Figure 3:
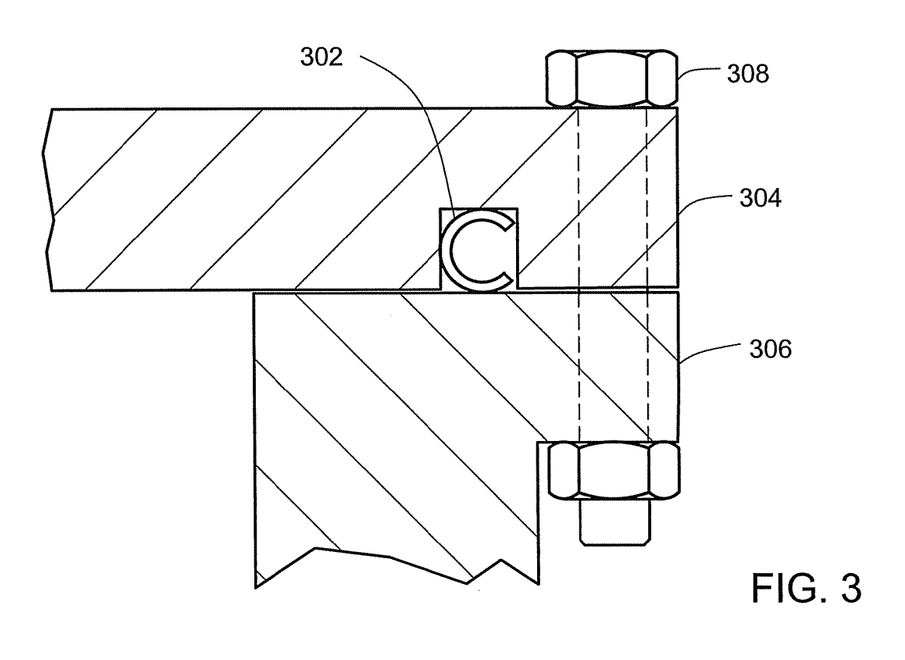
FIG. 3 illustrates a vacuum metal C-seal.

FIG. 3 illustrates a metal C-seal 302 of the type useful in a high vacuum application. The metal C-seal 302 is clamped between massive metal flanges 304, 306 is by large, closely spaced bolts 308 (only one of which is illustrated in FIG. 3). There are large clamping forces exerted on the C-seal 302 by the massive flanges 304, 306 of a vacuum chamber. The large clamping forces are on the order of 350 pounds force per running inch of the C-seal 302, or more. These high forces are generated by bolted interfaces and elastic and inelastic deformation of the C-Seal's principal material, such as Inconel and stainless steel. The inelastic deformation permanently changes the shape of the C-seal 302, and the C-seal 302 is not demateable and reusable. These high clamp forces are used to force the coating of the C-Seal, such as tin or other soft material into the residual surface roughness of the mating surfaces. The large clamping forces are able to deform the surface of the C-seal 302 enough to form a vacuum tight seal at room temperature. Without the high clamping forces, the C-seal is not reliably vacuum tight. The massive structures and high clamping forces used in the arrangement shown in FIG. 3 are not practical for use in disc drive applications.

The ideal seal face finish for metal vacuum seals has a residual roughness from machining in concentric rings parallel to a seal line of the seal. With this finish, there are no leak paths across the seal line, giving multiple opportunities for the seal to provide blockage for leaks. While this is easy to achieve by turning on the typical round vacuum flange, there is no economical way to achieve this ideal surface finish on the generally rectangular shaped disc drive housing seal, leaving the disc drive housing with a non-ideal surface finish with multiple leak paths across the seal line. Even if high preloading forces were available in the disc drive housing, the non-ideal surface finish would limit the effectiveness of metal vacuum seals.

Figure 4:
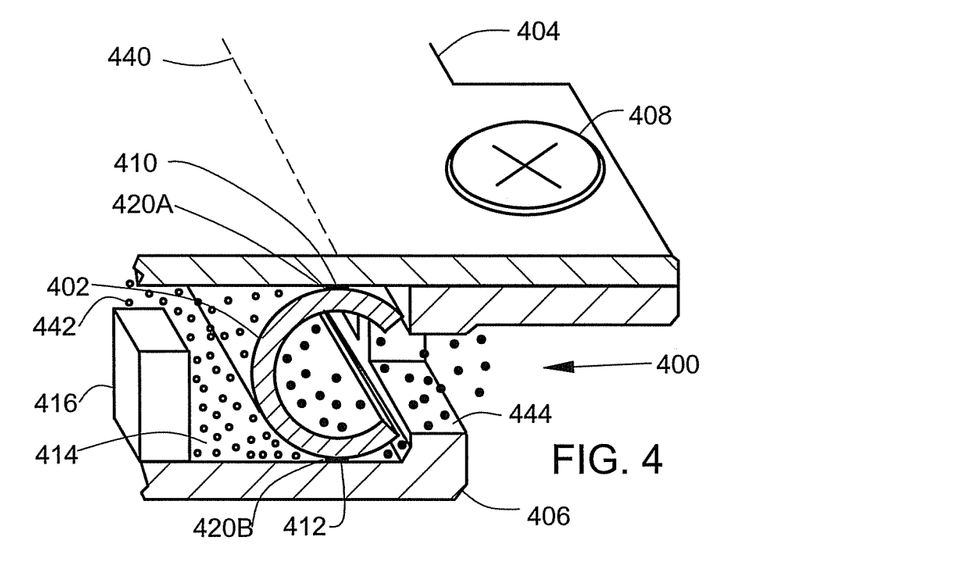
FIG. 4 illustrates a first embodiment of a heat-assisted spring seal.
Figure 5:
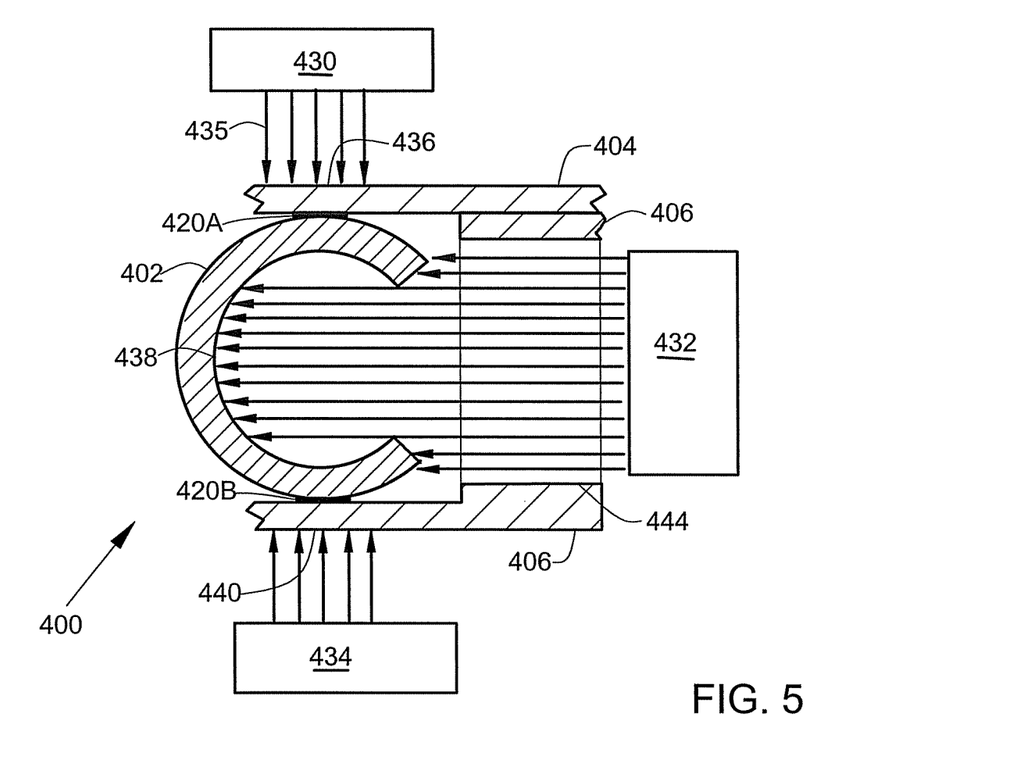
FIG. 5 illustrates an enlarged view of the heat-assisted spring seal of FIG. 4.

FIG. 4 illustrates a first embodiment of a hermetic seal 400 that can be used in lightweight assemblies with non-ideal seal surface finishes such as the disc drive illustrated in FIG. 1. FIG. 5 illustrates an enlarged view of a portion of the hermetic seal 400.

The hermetic seal 400 comprises a spring seal 402. The spring seal 402 is compressed between a top cover 404 and a bottom cover 406 (also called base 406) by a plurality of peripheral screws such as screw 408. The top and bottom covers 404, 406 are relatively thin and the compression of the spring seal 402 is slight, providing a limited sealing force between sealing surfaces 410, 412 on the covers 404, 406. The covers 404, 406 surround a gas-filled cavity 414 that houses heat sensitive components such as heat sensitive component 416. The limited sealing force is typically on the order of about 75 pounds force, or less, per running inch of the seal. The limited sealing force can thus be provided by a small number of widely spaced small screws such as 4-40 or 2-56 UNC machine screws. The spring seal 402 is preferably a continuous loop that runs the entire length of a sealing interface between the covers 404, 406. Since the sealing forces are low, the covers 204, 206 can have thin cross sections compatible with small form factor disc drive construction, without warpage of the covers 404, 406 due to sealing forces.

A film 420A, 420B joins the spring seal 402 to the sealing surfaces 410, 412. The film 420A, 420B comprises a material that is softenable by heat to hermetically seal the spring seal 402 to the sealing surfaces 410, 412 to fill in the non-ideal surface finish.

As shown in FIG. 5, one or more heat sources 430, 432, 434 apply heat 435 to one or more externally accessible surfaces 436, 438, 440 for selective application of the heat to the film 420A, 420B without overheating the heat sensitive component 416. A laser or focused infrared radiation can be used as a heat source. If needed, the externally accessible surfaces 436, 438, 440 can be provided with coatings or surface finishes that absorb the laser or infrared radiation. The heat 435 is preferably applied in a short pulse so that the film 420A, 420B is temporarily heated without applying enough heat to significantly heat up and damage sensitive component 416, such as a disc drive slider, disc, voice coil motor or electronic circuit.

The externally accessible surface 438 can be accessed through an access opening 444 in the cover 406. Only a limited amount of heat needs to be applied to soften the film 420A, 420B enough to conform to a surface roughness of the faces 410, 412. The softening and flow of the film 420A, 420B into voids in the surface roughness greatly increases the hermeticity of the seal. The film 420A, 420B need not melt and the film 420A, 420B need not bond to the faces 410, 412, and the hermetic seal 400 can remain demateable. The demateable hermetic seal can also be converted to a non-demateable hermetic seal, if desired, by increased selective heating of the film 420A, 420B above a melting temperature of the film 420A, 420B so that the film 420A, 420B bonds to the faces 410, 412. In one preferred arrangement, the faces 410, 412 are selectively plated with a wettable metal plating that is easily wetted by the film to provide a non-demateable soldered seal. The wettable metal plating can comprise tin, solder-plated over nickel, or other suitable coating.

The spring seal 402 preferably comprises a generally C-shaped cross-section as illustrated. The spring seal 402 and the covers 404, 406 are preferably formed of metal to provide good hermeticity. The limited sealing force between the spring seal 402 and the faces 410, 412 is preferably less than 75 pounds force per running inch (along direction 440 in FIG. 4) of the spring seal 402.

The cavity 414 is preferably filled with a fill gas 442 that comprises helium. In one preferred arrangement, the helium comprises at least 90% of the weight of the fill gas. The hermetic seal preferably has a leak rate of less than $3.2 \times 10^{-8}$ cubic centimeters per second to provide a useful life for the fill gas of five years or more.

The film 420A, 420B can be deposited on either the spring seal 402 or the faces 410, 412. The film can be selectively deposited in areas where it is needed for sealing, or deposited over larger areas. In one preferred embodiment, the film 420A, 420B comprises a soft metal plating, for example tin. In another preferred embodiment, the film 420A, 420B comprises an organic material such as polycarbonate. The film 420A, 420B preferably has a deformation or softening temperature that is under an average bulk temperature of 100 degrees Centigrade and a localized short duration peak temperature of under 200 degrees Centigrade with the limited sealing force applied.

Even in applications were a higher seal force of up to 350 lbs per inch can be applied, typically by a preloading of the covers before screw installation, the application of heat to the film can improve yield, as well as allowing the reuse of seals, especially when non-ideal, or worn seal face surface finishes are used. The application of heat has the additional advantage of speeding up the time for flowing of film into the residual roughness of the seal faces from hours to seconds. The faster sealing time makes metal seals more applicable to disc drive automation processes that have individual assembly step times of less than 5 seconds.

The arrangement shown in FIG. 4 provides a robust seal suitable for use with a disc drive with a good manufacturing yield. The demateable feature of the seal permits a disc drive or other sealed assembly to be opened up for rework or repairs and then permits the disc drive to be resealed. In instances where a demateable seal is found to fail a leak test, the seal can be reheated to an even higher temperature to provide a solder seal, thereby overcoming the defect.

Figures 6, 7, 8:
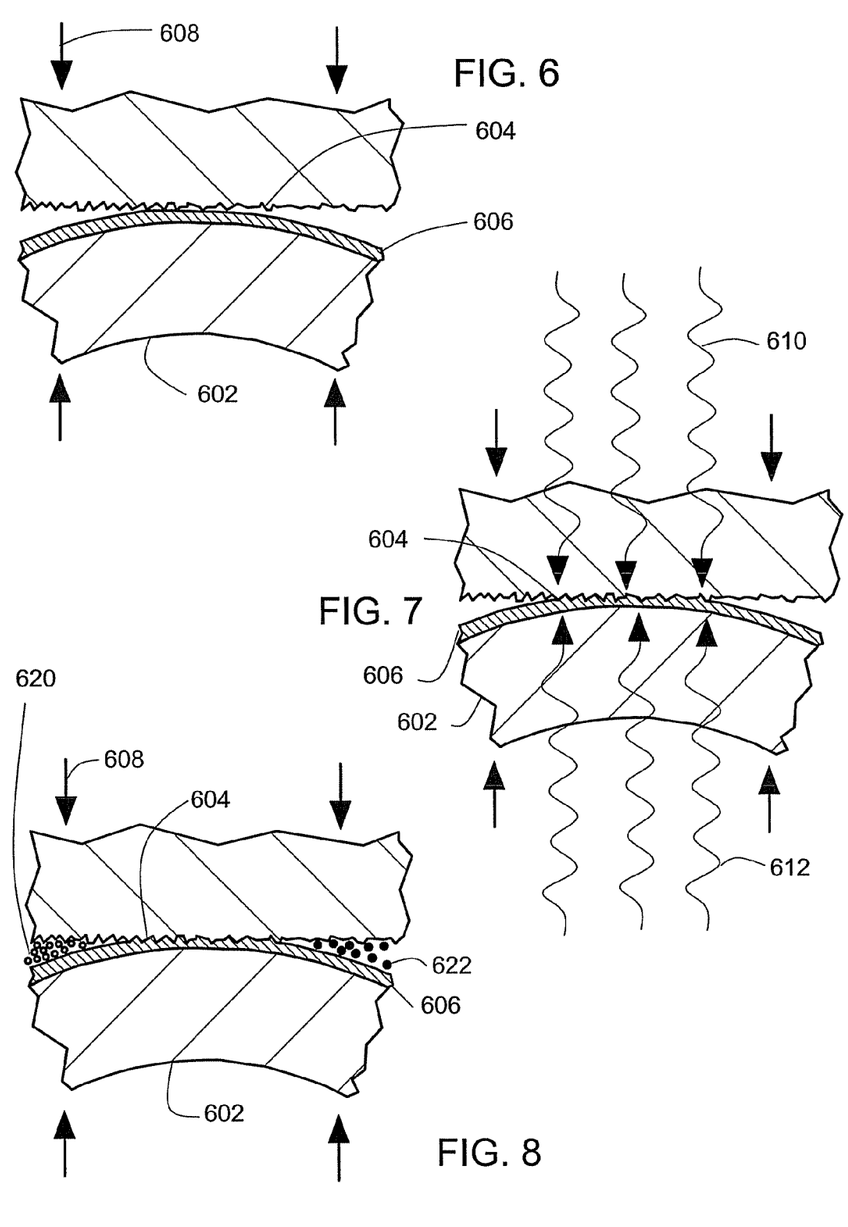
FIGS. 6-8 illustrate process steps in forming a heat-assisted hermetic seal.

FIGS. 6, 7, 8 illustrate process steps in forming a hermetic seal such as hermetic seal 400 described above in connection with FIG. 4. As illustrated in FIG. 6, a spring seal 602 is lightly compressed with a limited sealing force 608 against a cover face 604. The spring seal 602 is provided with a film 606 that is a heat-softenable film that is compressed between the spring seal 602 and the cover face 604. In FIG. 6, there is an incomplete, non-hermetic seal formed between the face 604 and the film 606 due to the surface roughness on surfaces of the cover 604 and the limited amplitude of the sealing force 608.

As illustrated in FIG. 7, heat 610, 612 is selectively applied to externally accessible surfaces to selectively heat the heat-softenable film 606 without overheating nearby heat sensitive components. The heat softens the heat-softenable film 606 to hermetically seal the spring seal 602 to the face 604. The film 606 deforms to at least partially fill the surface roughness on the cover face 604. The hermeticity of the seal is comparable to the hermeticity of a vacuum tight seal, but without a need for high sealing forces, and without a need to heat a complete assembly that uses the seal.

As illustrated in FIG. 8, the assembly is cooled and an internal cavity is filled with a fill gas 620. The fill gas 620 is hermetically sealed in, and air 622 is hermetically sealed out. The heat-softenable film 606 preferably has a softening temperature that is under an average bulk temperature of 100 degrees Centigrade and localized short duration peak temperatures of under 200 degrees Centigrade with the limited sealing force 608 applied to provide a demateable seal.

If desired, further heat can be applied to increase the temperature of the film 606 to a melting temperature of the film, and then cooled to form a non-demateable soldered hermetic seal.

Figure 9:
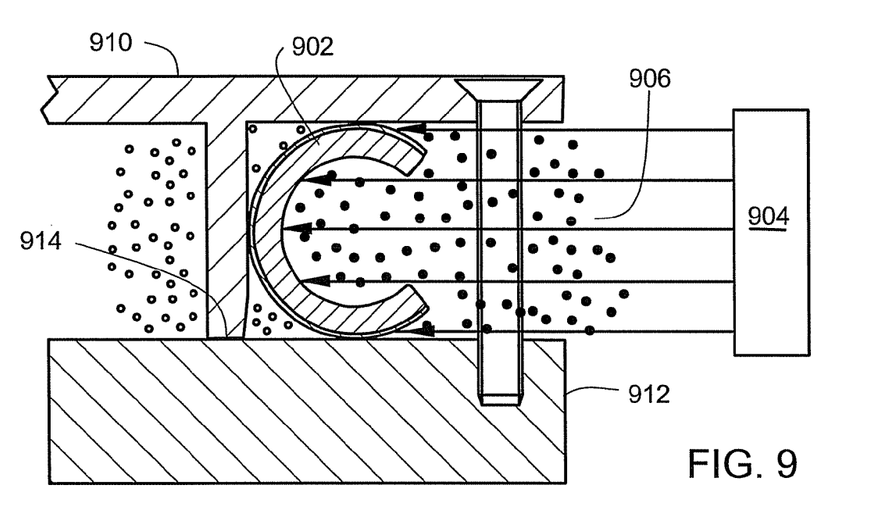
FIGS. 9-11 illustrate second, third, and fourth embodiments of heat-assisted spring seals.
Figure 10:
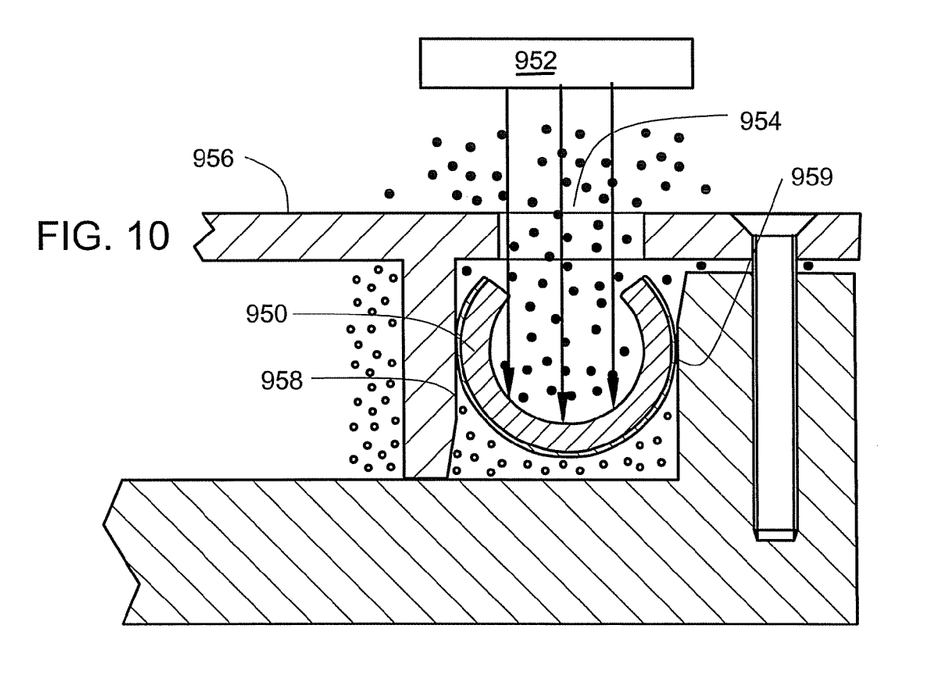
Figure 11:
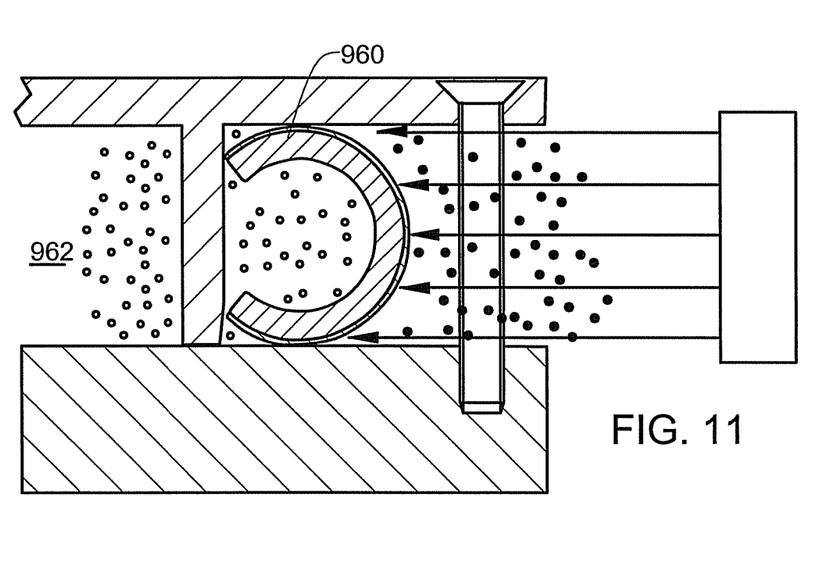

FIGS. 9-11 illustrate second, third and fourth embodiments of heat-assisted spring seals. As illustrated in FIG. 9, a spring seal 902 is accessible for heating by a heat source 904 through an access opening 906 between covers 910, 912. A rim 914 of the cover 910 acts as a mechanical stop and contacts the cover 912 to limit the compressive force applied to the spring seal 902.

As illustrated in FIG. 10, a spring seal 950 is accessible for heating by a heat source 952 through an opening 954 in a cover 956. The compressive force on the spring seal 950 is limited by a fixed spacing between a rim 958 and a rim 959.

As illustrated in FIG. 11, a spring seal 960 can be arranged to have an opening that faces toward a gas filled cavity 962. In other respects, the arrangement in FIG. 11 is similar to the arrangement in FIG. 9.

Features described in connection with one of the embodiments described in connection with FIGS. 4-11 can be appropriately adapted to other embodiments described in connection with FIGS. 4-11.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the hermetic seal system while maintaining substantially the same functionality without departing from the scope of the present invention. In addition, although the preferred embodiment described herein is directed to a disc drive system for data storage, it will be appreciated by those skilled in the art that the teachings of the present invention can be applied to other gas-filled sealed assemblies, without departing from the scope of the present invention.

What is claimed is:

1. A method of hermetic sealing, comprising:
    compressing a spring seal with a limited sealing force between sealing surfaces that surround a gas-filled cavity that houses heat sensitive components;
    providing a heat-softenable film between the spring seal and the sealing surfaces; and
    applying heat to an externally accessible surface to selectively heat the heat-softenable film without overheating the heat sensitive components, the heat softening the heat-softenable film to hermetically seal the spring seal to the sealing surfaces.

2. The method of claim 1 wherein the heat-softenable film has a softening temperature that is under an average bulk temperature of 100 degrees Centigrade with the limited sealing force applied, and applying the heat until the temperature of the film is between 100 and 200 degrees Centigrade.

3. The method of claim 1 and further comprising:
    further applying heat to increase the temperature of the film to a melting temperature of the film; and
    allowing the film to cool to below the melting temperature to form a non-demateable hermetic seal.

4. The method of claim 1 and further comprising: applying the heat-softenable film to the spring seal.

5. The method of claim 1 and further comprising: applying the heat-softenable film to the sealing surfaces.

6. The method of claim 1 and providing the limited sealing force at less than 75 pounds force per running inch of the spring seal.

7. The method of claim 1 and positioning the spring seal to surround a fill gas that comprises helium.

8. The method of claim 7 and providing the fill gas with a composition of at least 90% helium by weight.

9. The method of claim 1 and depositing the heat-softenable film on the spring seal.

10. The method of claim 1 and depositing the heat-softenable film adjacent the spring seal on the sealing surfaces.

11. The method of claim 1 and forming the heat-softenable film from a soft metal plating.

12. The method of claim 1 and forming the heat-softenable film from a tin plating.

13. The method of claim 1 and forming the heat-softenable film from an organic film.

14. A method of hermetic sealing, comprising:
providing a spring seal with a C-shaped cross-section;
compressing the spring seal with a limited sealing force between sealing surfaces that surround a gas-filled cavity that houses heat sensitive components;
providing a heat-softenable film between the spring seal and the sealing surfaces; and
applying heat to an externally accessible surface of the spring seal to selectively heat the heat-softenable film without overheating the heat sensitive components, the heat softening the heat-softenable film to hermetically seal the spring seal to the sealing surfaces, the heating forming a sealing capability that did not exist prior to the application of the heat.

15. The method of claim 14 and depositing the heat-softenable film on the spring seal.

16. The method of claim 14 and depositing the heat-softenable film adjacent the spring seal on the sealing surfaces.

17. The method of claim 14 and forming the heat-softenable film from a soft metal plating.

18. The method of claim 14 and forming the heat-softenable film from an organic film.

19. The method of claim 14 and applying the heat selectively through an opening in the spring seal.

* * * * *